United States Patent [19]

Fujikawa

[11] Patent Number: 5,699,241
[45] Date of Patent: Dec. 16, 1997

[54] SWITCHING POWER SOURCE UNIT

[75] Inventor: Katsumi Fujikawa, Odawara, Japan

[73] Assignee: Hitachi, Ltd., Tokyo, Japan

[21] Appl. No.: 608,270

[22] Filed: Feb. 28, 1996

[30] Foreign Application Priority Data

Mar. 1, 1995 [JP] Japan .................................. 7-041959

[51] Int. Cl.⁶ .................................................. H02M 1/00
[52] U.S. Cl. ................................................ 363/144; 363/141
[58] Field of Search ..................................... 363/141, 144

[56] References Cited

U.S. PATENT DOCUMENTS

| | | | |
|---|---|---|---|
| 4,420,364 | 12/1983 | Nukii et al. ................... | 216/20 |
| 4,843,520 | 6/1989 | Nakatani et al. ............... | 361/739 |
| 4,949,220 | 8/1990 | Tashiro ......................... | 363/144 |
| 5,497,280 | 3/1996 | Sugishima et al. ............. | 363/141 |

FOREIGN PATENT DOCUMENTS 5-275822A 10/1993 Japan .

OTHER PUBLICATIONS

Abstract of Japanese Patent Publ. No. 5-275822 (Oct. 22, 1993) (Mitsubishi Electric Corp.

*Primary Examiner*—Stuart N. Hecker
*Attorney, Agent, or Firm*—Kenyon & Kenyon

[57] ABSTRACT

A switching power source unit has a constitution that the DC-DC portion 5 in which electronic parts are mounted on a metal core substrate and the AC-DC portion 6 in which electronic parts are mounted on a glass epoxy substrate are mounted in the same metallic outer cabinet 1, for example, the metal core substrate is attached on the heat sink 19 and the heat sink 19 is set in contact with the outer cabinet 1 so as to radiate heat from the metal core substrate.

18 Claims, 3 Drawing Sheets

SWITCHING POWER SOURCE UNIT

BACKGROUND OF THE INVENTION

The present invention relates to a switching power source unit mounted in various devices and particularly to a switching power source unit having a DC-DC converter portion (hereinafter called a DC-DC portion) comprising various electronic parts including a number of heating parts mounted on a metal core wiring substrate (wiring substrate having a wiring pattern formed by copper foil or others mounted on an insulation coated metallic plate which is insulation-processed, for example, an aluminum substrate, hereinafter called a metal core substrate) and an AC-DC converter portion (hereinafter called AC-DC portion) comprising various electronic parts mounted on a glass epoxy wiring substrate (hereinafter called a glass epoxy substrate) which are mounted in the same cabinet.

A conventional switching power source unit generally has the following constitution. Namely, a DC-DC portion including a number of power semiconductors which are heating parts and an AC-DC portion including few heating parts are structured by mounting electronic parts on the same glass epoxy substrate and the heating parts, such as power semiconductors, are mounted on a plurality of large heat sinks mounted on the glass epoxy substrate so as to radiate heat.

A box-type switching power source unit having an outer cabinet wherein the above glass epoxy cabinet is mounted or an open frame type switching power source unit having a sheet metal whereon the above glass epoxy substrate is mounted have been commercialized. The box-type switching power source unit is structured so that an AC input receiving connector or a terminal block and a DC output supply connector or a terminal block are at ranged on the front of the outer cabinet.

Japanese Laid-Open Patent Application No. 5-275822 discloses an art for electrically connecting a metallic substrate (metal core substrate) on which electronic parts requiring heat radiation using cooling fins are mounted and a plastic substrate on which electronic parts requiring no heat radiation using cooling fins are mounted.

As mentioned above, the switching power source unit by the prior art constitutes a DC-DC portion including a number of power semiconductors which are heating parts and an AC-DC portion including few heating parts by mounting various electronic parts on the same glass epoxy substrate and mounts the heating parts of the DC-DC portion on a plurality of large heat sinks so as to radiate heat. Therefore, the following problems arise.

The first problem is that in using a plurality of large heat sinks, the occupied volume of components on the glass epoxy substrate mounting a plurality of large heat sinks and the substrate size increase. Accordingly the power unit is enlarged, it becomes less operable due to such enlargement, and the cost increases.

Since a DC-DC portion including a number of heating parts is mounted on the glass epoxy substrate, it is impossible to say definitely that the substrate would not burn under the worst conditions.

Furthermore, the circuit line at each location where a large current flows requires that the temperature rise of the wiring pattern is controlled to less than the specified value, so that the wiring pattern width is extended. Accordingly, the substrate, and consequently the unit, are enlarged.

Furthermore, in each location where a high voltage is applied, the creeping distance between the circuit lines is enlarged so as to prevent tracking (a short-circuit due to progress of local reduction of the insulation property), so that also in this respect, the substrate and the unit are enlarged.

In a switching power source unit by the prior art, heating parts, such as power semiconductors, are mounted on large heat sinks so as to radiate heat. As a result, the following problems arise.

Firstly, since heating parts, such as power semiconductors, are mounted on a plurality of large heat sinks, as mentioned above, the substrate is enlarged and the mechanical strength of the substrate is increased, so that reinforcing members are often required and hence also in this respect, the unit is enlarged.

Since power semiconductors are mounted on large heat sinks, it is extremely difficult to design a most suitable wiring pattern and failures, such as occurrence of noise due to the effect of the wiring pattern, occur easily.

To detect the temperature of large heat sinks where power semiconductors are mounted, it is necessary to mount a temperature detection element on each large heat sink, so that failures such as a reduction in reliability and an increase in the cost due to use of the temperature detection element occur.

Furthermore, in a box type switching power source unit by the prior art, an AC input receiving connector or a terminal block and a DC output supply connector or a terminal block are arranged on the front of the outer cabinet. Therefore, the following additional problems arise.

When terminal blocks are used for AC input reception and DC output supply, it is necessary to use a tool for access to the terminal blocks.

When connectors are used for AC input reception and DC output supply, it is necessary to provide cable fixing means because cables are concentrated on the front of the outer cabinet and a tool is required so as to insert or remove the power unit.

On the other hand, the aforementioned prior art disclosed in Japanese Laid-Open Patent Application No. 5-275822 does not refer to appropriate use of a metallic substrate (metal core substrate) and a plastic substrate for each power unit function. Furthermore, it is extremely difficult to design a most suitable circuit, the wiring layout effect becomes worse, and miniaturization and high-density mounting are impeded. Heat radiation from a metallic substrate depends only on large cooling fins (heat sinks) and more efficient heat radiation from the cooling fins and use of a heat radiation means other than the cooling fins are not taken into account. Furthermore, the metallic substrate and the plastic substrate are connected to each other with wires or metallic pieces. However, the operability of connection by wires is not satisfactory and the degree of freedom by the use of metallic pieces for connection.

SUMMARY OF THE INVENTION

An object of the present invention is to provide a switching power source unit which is miniature, highly reliable, inexpensive, and easily operable.

To accomplish the above object, the switching power source unit of the present invention has a constitution wherein a DC-DC portion in which electronic parts are mounted on a metal core substrate, and an AC-DC portion in which electronic parts are mounted on a glass epoxy substrate, are mounted in the same metallic outer cabinet; for example, a constitution wherein the metal core substrate is attached on heat sinks and the heat sinks are set in contact with the outer cabinet so as to radiate heat from the metal core substrate. Furthermore, the switching power source unit has a constitution wherein the metal core substrate and the glass epoxy substrate are connected to each other with a flexible wiring plate (hereinafter referred to as FPC).

The DC-DC portion including a number of heating parts is structured by mounting surface-mounting type electronic parts on a metal core substrate having a satisfactory heat conduction characteristic by soldering and the AC-DC portion including few heating parts is structured by mounting insertion type electronic parts on a glass epoxy substrate by soldering. In a metallic outer cabinet, the metal core substrate and the glass epoxy substrate are mounted.

In a switching power source unit having the aforementioned constitution, power semiconductors and a choke coil which are heating parts and a switching transformer handling high voltage are mounted on a metal core substrate having a satisfactory heat conduction characteristic and tracking characteristic, so that heat sinks to be mounted on the metal core substrate are unnecessary and hence the metal core substrate can be miniaturized and the completed metal core substrate assembly can be thinned. The wiring pattern width and the pattern interval on the metal core substrate can be reduced, so that also in this respect, the substrate size of the metal core substrate can be reduced. Furthermore, the metal core substrate will not be carbonized by abnormal heat generation of a heating part, so that burning of the substrate can be prevented. On the other hand, since the AC-DC portion having few heating parts requires no heat sinks from the beginning, the substrate size of the glass epoxy substrate can be reduced. By doing this, the metal core substrate and the glass epoxy substrate can be miniaturized and even if a constitution where the metal core substrate is attached to heat sinks is used, the heat sinks can be thinned and the size thereof can be comparatively reduced, so that the whole switching power source unit can be miniaturized. Furthermore, the cost of heat sinks can be decreased and the temperature detection elements to be attached to the heat sinks can be made unnecessary or reduced, so that the cost of the switching power source unit can be decreased. Since there is no possibility of burning of the substrate, the reliability increases. Furthermore, since the power unit can be miniaturized, handling and installation become easy and the operability improves.

The metal core substrate and the glass epoxy substrate mounted in the metallic outer cabinet are connected to each other, for example, by an FPC of rolled copper foil coated with an insulating base material. In this case, it is essential to consider an output from the metal core substrate as a large current and it is necessary to select a connection method which withstands this current capacity. The FPC of rolled copper foil coated with an insulating base material conforms to this request. The producible maximum thickness of the FPC conductor is 0.25 mm and the conductor can be thickened compared with the conventional maximum thickness 0.035 mm of the conductor on the glass epoxy substrate and as a result, the wiring pattern width can be reduced, so that the conductor to be connected can be lightened, thinned, and shortened. Furthermore, since the FPC can be bent, it can be processed in a free form though the attaching location is limited, so that the operability improves.

As a means for radiating heat from the metal core substrate, for example, the metal core substrate is attached on heat sinks, and the heat sinks are set in surface-contact with the outer cabinet, and the heat sinks and outer cabinet are used as a heat radiation means. By doing this, heat generated in the metal core substrate having a satisfactory heat conduction characteristic is transmitted to the heat sinks having a satisfactory heat conduction characteristic and heat radiation characteristic from the metal core substrate and radiated from the heat sinks and furthermore transmitted to the outer cabinet having a satisfactory heat conduction characteristic from the heat sinks at the same time and radiated from the outer cabinet. For heat radiation by the heat sinks and outer cabinet, a heat radiation promotion means such as forced air cooling or forced water cooling may be used in addition to natural air cooling so as to radiate heat more effectively. Therefore, the heat radiation characteristic improves substantially and as a result, large heat sinks are unnecessary, the power unit can be miniaturized, and the thermal reliability improves.

In general, a switching power source unit which is miniature, highly reliable, inexpensive, and easily operable can be realized.

DETAILED DESCRIPTION

Figure 1:
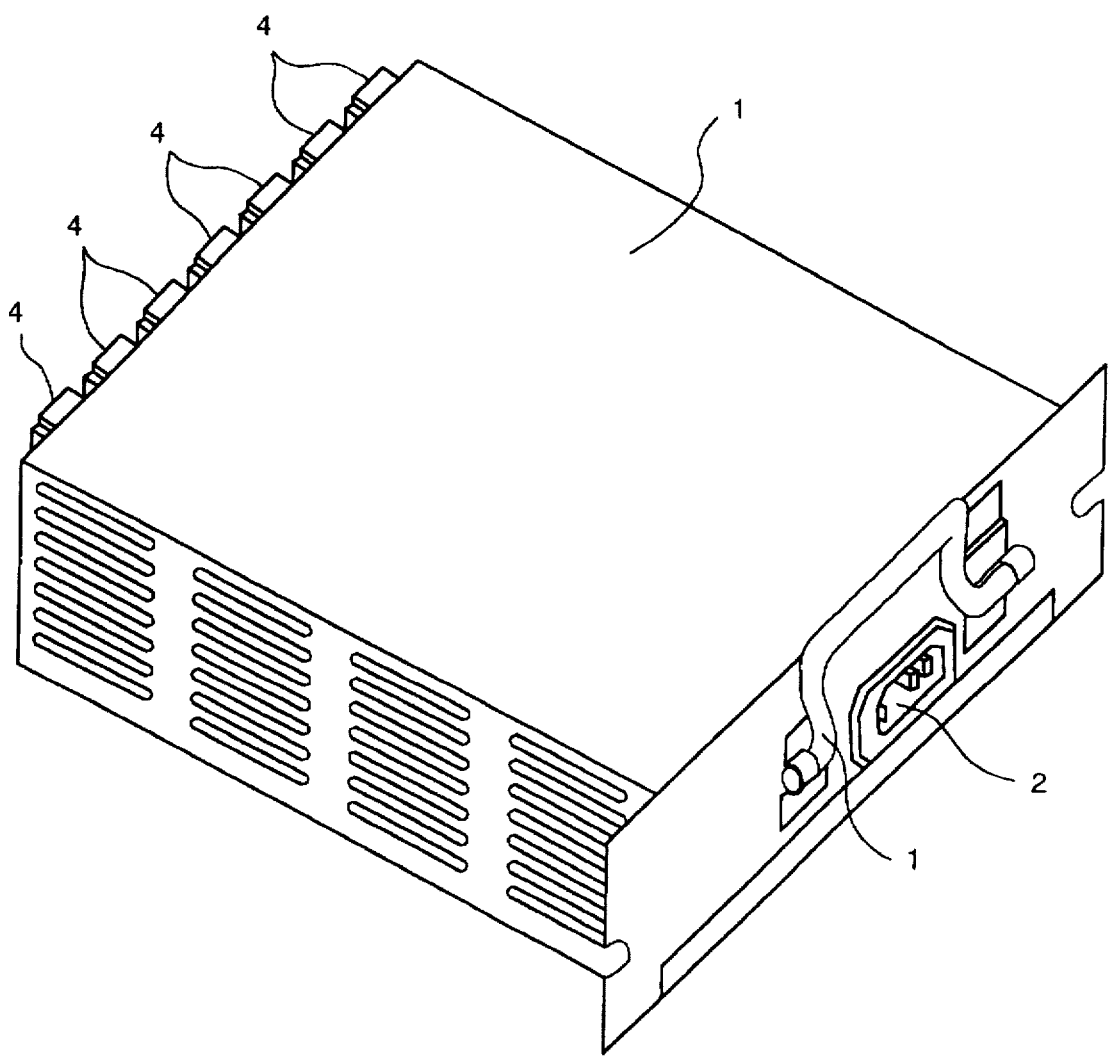
FIG. 1 is a perspective view showing the appearance of a switching power source unit relating to an embodiment of the present invention.

The embodiments of the present invention will be explained hereunder in connection with FIGS. 1 to 3. FIG. 1 is a perspective view showing the appearance of a switching power source unit.

In FIG. 1, a metal core substrate having a DC-DC portion and a glass epoxy substrate having an AC-DC portion are mounted in a metallic outer cabinet 1 of the switching power source unit. On the front side of the outer cabinet 1, an AC input receiving connector 2 and a metal fitting 3 for taking out the power unit are attached. On the rear side of the outer cabinet 1, DC output supply connectors 4 are attached as dedicated connectors for the back board.

As an AC input receiving connector 2, an inlet connector which is a general product available on the market is used and structured so that no tool is required for insertion into or removal from the connector 2. When the switching power source unit is housed in the system cabinet, the DC output supply connectors 4 can be directly inserted into or removed from (fitted or removed) the connector portion of the back board in the system cabinet and structured so that no tool is required for insertion or removal of the connectors 4. The metal fitting 3 for taking out the power unit is used so as to pull out the switching power source unit from the system cabinet.

An AC voltage is supplied to the switching power source unit from the AC input receiving connector 2, converted to a DC voltage in the power unit, and supplied to the necessary portions in the system as a DC output voltage from the DC output supply connectors 4.

Figure 2:
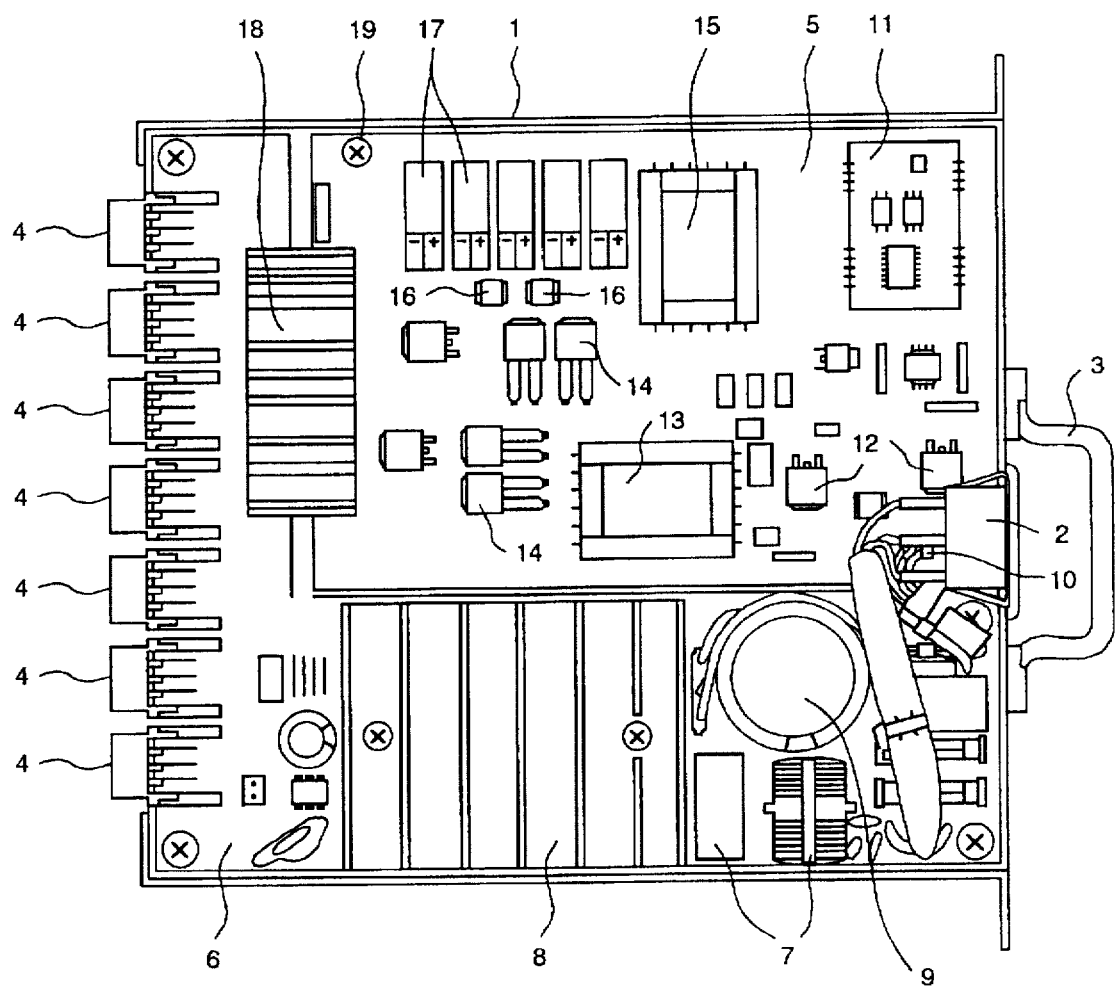
FIG. 2 is a plan view showing the internal structure of a switching power source unit relating to an embodiment of the present invention.

FIG. 2 is a plan view showing the internal structure of the switching power source unit in this embodiment. In the drawing, a DC-DC portion 5 including a number of heating parts is formed on a metal core substrate (wiring substrate in which a wiring pattern is formed on an insulation-coated aluminum substrate in this embodiment) having a satisfactory heat conduction characteristic. An AC-DC portion 6 having few heating parts is formed on the glass epoxy substrate.

In FIG. 2, a line filter 7, a harmonic current suppression circuit module 8, and an aluminum electrolytic capacitor 9 are mounted on the substrate. An input voltage supply connector 10, a hybrid IC 11 (thick film mixture integrated circuit) including a pulse width control circuit and an error detection circuit, a switching element 12, a high frequency transformer 13, a rectifying diode 14, a choke coil 15, a ceramic capacitor 16, an aluminum electrolytic capacitor 17, a current supply FPC 18, and a heat sink 19 are mounted on the substrates 5.

In the switching power source unit in this embodiment, an AC input is received by the AC input receiving connector 2 and a noise component superimposed with the AC input voltage and high frequency noise generated by the switching power source unit are prevented from feedback to the AC input power line by the line filter 7 comprising a choke coil and a capacitor. The AC voltage, the noise component of which is removed by the line filter 7, is applied to the harmonic current suppression circuit module 8 and the input current to the switching power source unit is shaped to a sine wave by the harmonic current suppression circuit module 8 and then stored in the aluminum electrolytic capacitor 9 as a DC voltage. The DC voltage stored in the aluminum electrolytic capacitor 9 is supplied to the DC-DC portion 5 via the input voltage supply connector 10.

The DC voltage supplied to the DC-DC portion 5 is converted to a high frequency AC voltage at the predetermined frequency by the high frequency switching element 12 and the converted high frequency AC voltage is dropped to the predetermined voltage by the high frequency transformer 13. The dropped high frequency AC voltage is rectified by the secondary side rectifying diode 14, and the high frequency noise is removed by a smoothing circuit comprising the choke coil 15, the ceramic capacitor 16, and the aluminum electrolytic capacitor 17, and the smoothed high frequency AC voltage is sent to the output voltage supply connectors 4 of the AC-DC portion 6 as an output voltage via the output current supply FPC 18.

The output voltage stabilizing function and the control circuit, such as the detection circuit, are structured as the aforementioned hybrid IC (thick film mixture integrated circuit) 11 in which parts are mounted on a ceramic substrate.

Figure 3:
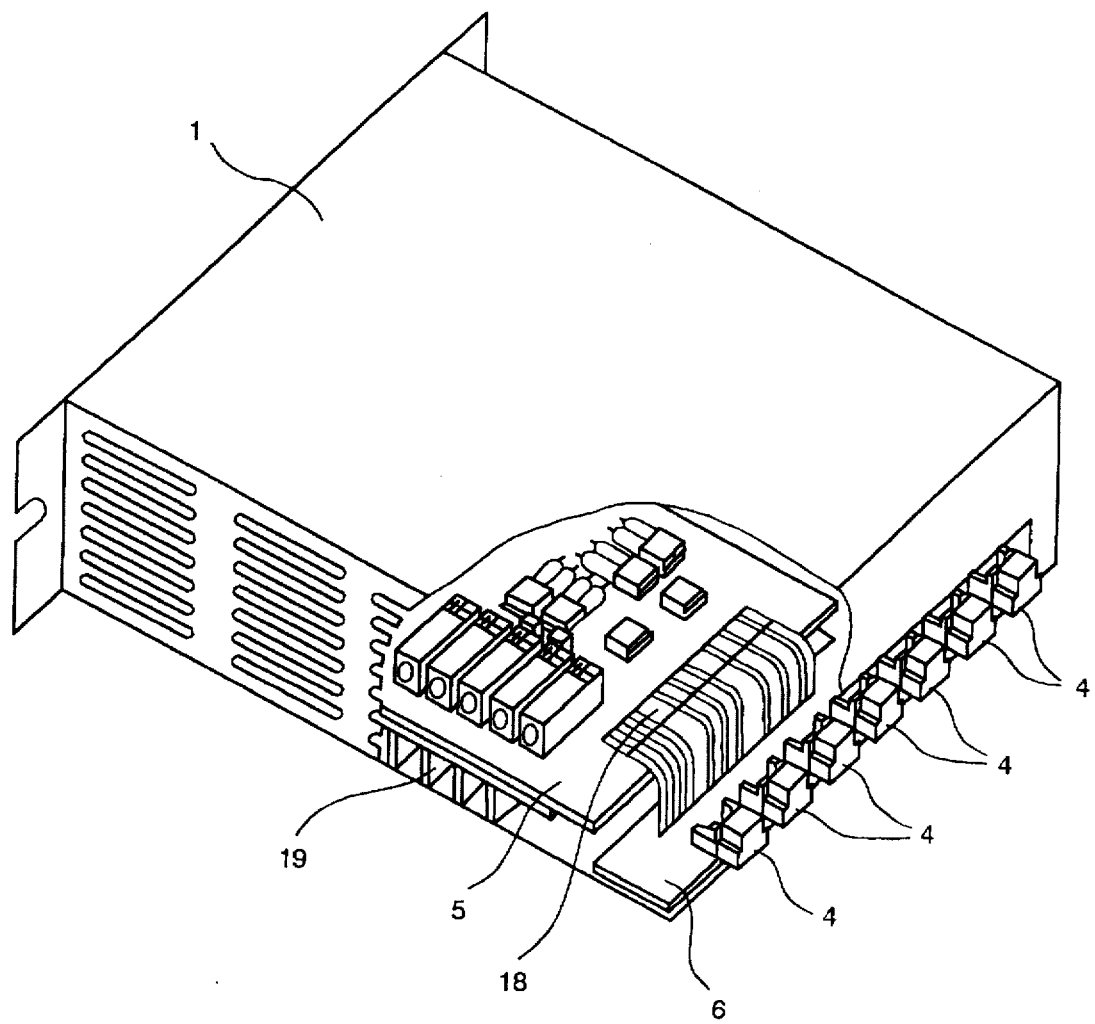
FIG. 3 is a perspective view showing an outer cabinet of a switching power source unit relating to an embodiment of the present invention which is partially notched.

FIG. 3 is a perspective view showing the outer cabinet of the switching power source unit of the present invention which is partially notched. As shown in FIG. 3, in this embodiment, the DC-DC portion 5 including a number of heating parts is mounted on the metallic heat sink 19 so as to radiate heat and the tip surface side of each fin of the heat sink 19 is in surface-contact with the outer cabinet 1. The heat sink 19 in this embodiment is in a flat form having the plane size similar to the substrate size of the DC-DC portion 5. Heat Generated in the metal core substrate (that is, the DC- DC portion 5) having a satisfactory heat conduction characteristic is transmitted to the heat sink 19 having a satisfactory heat conduction characteristic and heat radiation characteristic from the metal core substrate and radiated from the heat sink 19 and furthermore transmitted to the outer cabinet 1 having a satisfactory heat conduction characteristic from the heat sink 19 at the same time and radiated form the outer cabinet 1. Therefore, heat generated from the DC-DC portion 5 is diffused and radiated promptly and certainly.

The heating parts of the DC-DC portion 5 is not mounted on the heat sink and loaded on the glass epoxy substrate as conventional but directly mounted on the metal core substrate having a satisfactory heat conduction characteristic and tracking characteristic, so that a heat sink to be loaded on the metal core substrate is not necessary, and the metal core substrate can be miniaturized and, the completed metal core substrate assembly can be thinned. Furthermore, the wiring pattern width and pattern interval on the metal core substrate can be reduced, so that also in this respect, the substrate size of the metal core substrate can be reduced. Furthermore, the metal core substrate will not be carbonized by abnormal heat generation of a heating part, so that burning of the substrate can be prevented. On the other hand, since the AC-DC portion having few heating parts requires no heat sinks from the beginning, the substrate size of the glass epoxy substrate can be reduced.

By doing this, the metal core substrate and the glass epoxy substrate can be miniaturized and even if a constitution wherein the metal core substrate is attached to the heat sink 19 is used, the heat sink 19 can be thinned and the size thereof can be comparatively reduced, so that the whole switching power source unit can be miniaturized. Furthermore, the cost of the heat sink can be decreased and the temperature detection elements to be attached to the heat sink can be made unnecessary or reduced (for example, when temperature detection elements are to be attached to the metal core substrate, the number of elements may be one), so that the cost of the switching power source unit can be decreased.

Since there is no possibility of burning of the substrate, the reliability increases. Furthermore, since the power unit can be miniaturized, handling and installation thereof become easy and the operability improves.

According to this embodiment, the switching power source unit is structured so that the metal core substrate (the DC-DC portion 5) and the glass epoxy substrate (the AC-DC portion 6) are connected to each other by the FPC 18 of rolled copper foil coated with an insulating base material. In this case, it is essential to consider an output from the metal core substrate as a large current and it is necessary to select a connection method which withstands this current capacity. The FPC 18 of rolled copper foil coated with an insulating base material conforms to this requirement. The producible maximum thickness of the FPC conductor is 0.25 mm and the conductor can be thickened compared with the conventional maximum thickness of 0.035 mm of the conductor on the glass epoxy substrate and as a result, the wiring pattern width can be reduced, so that the conductor to be connected can be lightened, thinned, and shortened. Furthermore, since the FPC can be bent, it can be processed in a free form though the attaching location is limited, so that the operability improves.

In the aforementioned embodiment, as a means for radiating heat from the metal core substrate (the DC-DC portion 5), the metal core substrate itself and the heat sink 19 and the outer cabinet 1 are used. However, other various modifications may be used as a heat radiation means. For example, it is possible to attach the metal core substrate directly to the outer cabinet 1 and radiate heat from the metal core substrate and the outer cabinet 1. Or, it is also possible to structure the metal core substrate itself, for example, as a part of the bottom plate of the outer cabinet 1 and radiate heat from the metal core substrate and the outer cabinet 1. Furthermore, it is also possible to provide a heat transmission means, for example, a heat pipe or others so as to transmit heat from the metal core substrate mounted in the outer cabinet 1 to the outer cabinet. Appropriate use of the aforementioned means for radiating heat from various metal core substrates (DC-DC portion 5) increases the degree of freedom of design of a power unit and greatly contributes to miniaturization and thinning of the power unit.

Furthermore, for heat radiation from the metal core substrate, the heat sink 19, and the outer cabinet 1, a heat radiation promotion means, such as forced air cooling or forced water cooling, may be used in addition to natural air cooling. By doing this, the heat radiation characteristic improves much more.

In the aforementioned embodiment, the output from the metal core substrate (the DC-DC portion 5) is a large current and the FPC 18 is used as a connection method for withstanding this current capacity. However, needless to say, a connection method other than the FPC 18 can be used. In the metal core substrate, an insulation layer is formed on the metal base and a wiring pattern is formed on it, so that it is not desirable to bore an additional hole in the metal base for connection to another location (because the wiring pattern and the metal base are electrically connected to each other).

As a connection method which withstands a large current capacity and requires no connection hole in the metal core substrate, other than the FPC 18, for example, a constitution wherein the metal core substrate (the DC-DC portion 5) and the glass epoxy substrate (the AC-DC portion 6) are connected to each other by soldering or screwing a conductive metal sheet may be used. Or, it is also possible to mount a surface-attaching type connector having a gilded contact on the metal core substrate by soldering and connect the metal core substrate (the DC-DC portion 5) and the glass epoxy substrate (the AC-DC portion 6) to each other by this connector having a gilded contact. The reason for use of a connector having a Gilded contact is that even if the connector is exposed in a high temperature state during the soldering process, the contact is not changed chemically and the satisfactory contact reliability can be ensured (a connector having a tinned contact is changed chemically when it is exposed in a high temperature state and the contact reliability reduces).

As explained above, according to the present invention, a switching power source unit which is miniature, highly reliable, inexpensive, and easily operable can be realized and the industrial value thereof is extremely high.

What is claimed is:

1. A switching power source unit comprising:
   a metal core wiring substrate;
   a DC-DC converter having electronic parts mounted on said metal core wiring substrate;
   a plastic wiring substrate connected by a flexible wiring plate (FPC) to said metal core wiring substrate, the FPC having at least one edge connected directly face to face with the wiring substrate;
   an AC-DC converter having electronic parts mounted on said plastic wiring substrate; and
   a metallic outer cabinet in which at least said metal core wiring substrate is disposed, said metallic outer cabinet being directly attached to said metal core wiring substrate.

2. A switching power source unit according to claim 1, wherein the FPC is connected by solder.

3. A switching power source unit according to claim 1, wherein said metal core wiring substrate is arranged next to said plastic wiring substrate.

4. A switching power source unit comprising:
   a metal core wiring substrate;
   a DC-DC converter having electronic parts mounted on said metal core wiring substrate;
   a heat sink in contact with said metal core wiring substrate for radiating heat from said metal core wiring substrate;
   a plastic wiring substrate connected by a flexible wiring plate (FPC) to said metal core wiring substrate, the FPC having at least one edge connected directly face to face with the wiring substrate;
   an AC-DC converter having electronic parts mounted on said plastic wiring substrate; and
   a metallic outer cabinet in which at least said metal core wiring substrate is disposed and said heat sink, said metallic outer cabinet being directly attached to said heat sink.

5. A switching power source unit comprising:
   a metal core wiring substrate;
   a DC-DC converter having electronic pads mounted on said metal core wiring substrate;
   a plastic wiring substrate connected by a flexible wiring plate (FPC) to said metal core wiring substrate, the FPC having at least one edge connected directly face to face with the wiring substrate;
   an AC-DC converter having electronic parts mounted on said plastic wiring substrate; and
   a heat pipe in contact with said metal core wiring substrate;
   a metallic outer cabinet in which at least said metal core wiring substrate and said heat pipe are disposed, said metallic outer cabinet being directly attached to said heat pipe, said heat pipe transmitting heat from said metal core wiring substrate to said metallic outer cabinet.

6. A switching power source unit comprising:
   a metal core wiring substrate;
   a DC-DC converter having electronic pads mounted on said metal core wiring substrate;
   a heat pipe in contact with said metal core wiring substrate;
   a heat sink in contact with said heat pipe;
   a plastic wiring substrate connected by a flexible wiring plate (FPC) to said metal core wiring substrate, the FPC having at least one edge connected directly face to face with the wiring substrate;
   an AC-DC converter having electronic parts mounted on said plastic wiring substrate; and
   a metallic outer cabinet in which at least said metal core wiring substrate, said heat pipe add said heat sink are disposed, said metallic outer cabinet directly attached to said heat sink, said heat pipe transmitting heat from said metal core wiring substrate to said heat sink.

7. A switching power source unit comprising:
   a metal core wiring substrate;
   a DC-DC converter having electronic parts mounted on said metal core wiring substrate;
   a plastic wiring substrate connected by a conductive metal sheet to said metal core wiring substrate, the conductive metal sheet having at least one edge connected directly face to face with the wiring substrate;
   an AC-DC converter having electronic parts mounted on said plastic wiring substrate; and
   a metallic outer cabinet in which at least said metal core wiring substrate is disposed, said metallic outer cabinet directly attached to said metal core wiring substrate.

8. A switching power source unit according to claim 7, wherein the conductive metal sheet is connected by either screw or solder.

9. A switching power source unit according to claim 7, wherein said metal core wiring substrate is arranged next to said plastic wiring substrate.

10. A switching power source unit comprising:
a metal core wiring substrate;
a DC-DC converter having electronic parts mounted on said metal core wiring substrate;
a heat sink in contact with said metal core wiring substrate for radiating heat from said metal core wiring substrate;
a plastic wiring substrate connected by a conductive metal sheet to said metal core wiring substrate, the conductive metal sheet having at least one edge connected directly face to face with the wiring substrate;
an AC-DC converter having electronic parts mounted on a plastic wiring substrate; and
a metallic outer cabinet in which at least said metal core wiring substrate and said heat sink are disposed, said metallic outer cabinet directly attached to the heat sink.

11. A switching power source unit comprising:
a metal core wiring substrate;
a DC-DC converter having electronic parts mounted on said metal core wiring substrate;
a heat pipe in contact with the metal core wiring substrate;
a plastic wiring substrate connected by a conductive metal sheet to said metal core wiring substrate, the conductive metal sheet having at least one edge connected directly face to face with said the wiring substrate;
an AC-DC converter having electronic parts mounted on said plastic wiring substrate; and
a metallic outer cabinet in which at least said metal core wiring substrate and said heat pipe are disposed, said metallic outer cabinet directly attached to said heat pipe, said heat pipe transmitting heat from said metal core wiring substrate to said metallic outer cabinet.

12. A switching power source unit comprising:
a metal core wiring substrate;
a DC-DC converter having electronic parts mounted on said metal core wiring substrate;
a heat pipe in contact with said metal core wiring substrate;
a heat sink in contact with said heat pipe;
a plastic wiring substrate connected by a conductive metal sheet to said metal core wiring substrate, the conductive metal sheet having at least one edge connected directly face to face with the wiring substrate;
an AC-DC converter having electronic parts mounted on said plastic wiring substrate; and
a metallic outer cabinet in which at least said metal core wiring substrate, said the heat pipe and said heat sink are disposed, said metallic outer cabinet directly attached to said heat sink, said heat pipe transmitting heat from said metal core wiring substrate to said heat sink and said heat sink radiating heat from said heat pipe to said metallic outer cabinet.

13. A switching power source unit comprising:
a metal core wiring substrate;
a DC-DC converter having electronic parts mounted on said metal core wiring substrate;
a plastic wiring substrate connected by a surface-attaching type connector to said metal core wiring substrate, the surface-attaching type connector having a gilded contact on at least one edge, the gilded contact connected directly face to face with the wiring substrate;
an AC-DC converter having electronic parts mounted on said plastic wiring substrate; and
a metallic outer cabinet in which at least said metal core wiring substrate and the surface-attaching type connector are disposed, the metallic outer cabinet directly attached to said metal core wiring substrate.

14. A switching power source unit according to claim 13, wherein the surface-attaching type connector is connected by either screw or solder.

15. A switching power source unit according to claim 13, wherein said metal core wiring substrate is arranged next to said plastic wiring substrate.

16. A switching power source unit comprising:
a metal core wiring substrate;
a DC-DC converter having electronic parts mounted on said metal core wiring substrate;
a heat sink in contact with the metal core wiring substrate for radiating heat from said metal core wiring substrate;
a plastic wiring substrate connected by a surface-attaching type connector to the metal core wiring substrate, the surface-attaching type connector having at least one edge connected directly face to face with the wiring substrate;
an AC-DC converter having electronic parts mounted on said plastic wiring substrate; and
a metallic outer cabinet in which at least said metal core wiring substrate and said heat sink are disposed, said metallic outer cabinet directly attached to said heat sink.

17. A switching power source unit comprising:
a metal core wiring substrate;
a DC-DC converter having electronic parts mounted on said metal core wiring substrate;
a heat pipe in contact with the metal core wiring substrate;
a plastic wiring substrate connected by a surface-attaching type connector with said metal core wiring substrate; the surface-attaching type connector having at least one edge connected directly face to face with the wiring substrate;
an AC-DC converter having electronic parts mounted on said plastic wiring substrate; and
a metallic outer cabinet in which at least said metal core wiring substrate and said heat pipe are disposed, said metallic outer cabinet directly attached to the heat pipe, said heat pipe transmitting heat from said metal core wiring substrate to a metallic outer cabinet.

18. A switching power source unit comprising:
a metal core wiring substrate;
a DC-DC converter having electronic parts mounted on said metal core wiring substrate;
a heat pipe in contact with the metal core wiring substrate;
a heat sink in contact with the heat pipe;
a plastic wiring substrate connected by a surface-attaching type connector to said metal core wiring substrate, the surface-attaching type connector having at least one edge connected directly face to face with the wiring substrate;
an AC-DC converter having electronic parts mounted on said plastic wiring substrate; and
a metallic outer cabinet in which at least said metal core wiring substrate, said heat pipe and said heat sink are disposed, said metallic outer cabinet directly attached to said heat sink, said heat pipe transmitting heat from said metal core wiring substrate to said heat sink and said heat sink radiating heat from said heat pipe to said metallic outer cabinet.

* * * * *

UNITED STATES PATENT AND TRADEMARK OFFICE
CERTIFICATE OF CORRECTION

PATENT NO. : 5,699,241
DATED : 16 December 1997
INVENTOR(S) : Katsumi FUJIKAWA

It is certified that error appears in the above-identified patent and that said Letters Patent is hereby corrected as shown below:

| Column | Line | |
|---|---|---|
| 1 | 34 | Change "at ranged" to --arranged--. |
| 1 | 54 | After "Accordingly" insert --,--. |
| 2 | 54 | After "freedom" insert --is reduced--. |
| 3 | 54 | Change "request" to --requirement--. |
| 3 | 57 | Before "0.035" insert --of--. |
| 7 | 33 | Change "Gilded" to --gilded--. |
| 8 | 33 | Change "pads" to --parts--. |
| 8 | 45 | Change "add" to --and--. |

Signed and Sealed this

Sixteenth Day of June, 1998

Attest:

BRUCE LEHMAN

Attesting Officer     Commissioner of Patents and Trademarks